(12) United States Patent
Mizrahi et al.

(10) Patent No.: US 11,563,770 B2
(45) Date of Patent: Jan. 24, 2023

(54) SYSTEM, DEVICE, AND METHOD OF DETERMINING CYBER ATTACK VECTORS AND MITIGATING CYBER ATTACKS

(71) Applicant: TENABLE, INC., Columbia, MD (US)

(72) Inventors: Itamar Yaakov Mizrahi, Tel Aviv (IL); Matan Hart, Savyon (IL); Yona Hollander, Tel Aviv (IL)

(73) Assignee: TENABLE, INC., Columbia, MD (US)

( * ) Notice: Subject to any disclaimer, the term of this patent is extended or adjusted under 35 U.S.C. 154(b) by 21 days.

(21) Appl. No.: 17/229,884

(22) Filed: Apr. 14, 2021

(65) Prior Publication Data

US 2022/0159033 A1 May 19, 2022

Related U.S. Application Data

(60) Provisional application No. 63/113,891, filed on Nov. 15, 2020.

(51) Int. Cl.
*H04L 29/06* (2006.01)
*H04L 9/40* (2022.01)

(52) U.S. Cl.
CPC ........ *H04L 63/1441* (2013.01); *H04L 63/102* (2013.01); *H04L 63/105* (2013.01); *H04L 63/1416* (2013.01); *H04L 63/1433* (2013.01)

(58) Field of Classification Search
CPC . H04L 63/1441; H04L 63/102; H04L 63/105; H04L 63/1416; H04L 63/1433
See application file for complete search history.

(56) References Cited

U.S. PATENT DOCUMENTS

| | | | |
|---|---|---|---|
| 9,292,695 B1 | 3/2016 | Bassett | |
| 2014/0245443 A1* | 8/2014 | Chakraborty | ....... H04L 63/1425 726/23 |

(Continued)

OTHER PUBLICATIONS

International Search Report in PCT/IL2021/051344, dated Mar. 9, 2022.

(Continued)

*Primary Examiner* — Kambiz Zand
*Assistant Examiner* — Afaq Ali
(74) *Attorney, Agent, or Firm* — Browdy and Neimark, PLLC

(57) ABSTRACT

System, device, and method of determining cyber-attack vectors and mitigating cyber-attacks. A method includes: scanning and mapping a network, and collecting data about network elements; generating a Permissions Directed-Graph, which indicates permissions that each network element has; generating a Network Connectivity Directed-Graph, which indicates accessible direct-communication routes between network elements; obtaining a list of attack techniques; applying a Static Verification process on the list of attack techniques, to generate an initial version of an Attacks Directed-Graph which maps particular attacks to network elements that are represented in the Permissions Directed-Graph and in the Network Connectivity Directed-Graph; performing a Dynamic Verification process, and constructing an updated list of dynamically-verified Attack Vectors that were verified as available within a particular operational context; generating a ranking for each dynamically-verified Attack Vector; prioritizing the dynamically-verified Attack Vectors, and prioritizing threat mitigation resources; activating threat mitigation resources based on the prioritization outputs.

20 Claims, 4 Drawing Sheets

(56) References Cited

U.S. PATENT DOCUMENTS

| | | | |
|---|---|---|---|
| 2020/0177618 A1 | 6/2020 | Hassanzadeh | |
| 2020/0244691 A1 | 7/2020 | Veeramany | |
| 2020/0358804 A1* | 11/2020 | Crabtree | H04L 63/1416 |
| 2021/0136101 A1* | 5/2021 | Ben-Yosef | H04L 63/1433 |
| 2022/0150268 A1* | 5/2022 | Herwono | G06F 21/552 |

OTHER PUBLICATIONS

Written Opinion of the International Searching Authority in PCT/IL2021/051344, dated Mar. 9, 2022.

* cited by examiner

SYSTEM, DEVICE, AND METHOD OF DETERMINING CYBER ATTACK VECTORS AND MITIGATING CYBER ATTACKS

CROSS-REFERENCE TO RELATED APPLICATIONS

This patent application claims benefit and priority from U.S. 63/113,891, filed on Nov. 15, 2020, which is hereby incorporated by reference in its entirety.

FIELD

Some embodiments are related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments may include devices, systems, and methods of determining or estimating or detecting cyber attack vectors, as well as attack vectors or attack surfaces or other vulnerabilities, and for mitigating or preventing or eliminating such security risks.

For example, a method may include: (a) scanning and mapping a communication network of an organization or an enterprise or a venue or a domain; (b) generating and updating a Permissions directed-graph; (c) generating and updating a Connectivity directed-graph; (d) based on static verification, generating an Attack Techniques directed graph; (e) based on dynamic verification, constructing representations of dynamically-verified Attack Vectors; (f) generating a Ranking for each dynamically-verified Attack Vector; (g) based on the rankings, performing prioritization of the dynamically-verified attack vectors and/or of threat mitigation resources; (h) optionally, deploying or triggering or activating one or more threat mitigation resources, based on one or more prioritization outputs.

Some embodiments may provide other and/or additional benefits or advantages.

DETAILED DESCRIPTION OF SOME DEMONSTRATIVE EMBODIMENTS OF THE PRESENT INVENTION

The present invention may include devices, systems, and methods of determining or estimating or detecting cyber attack vectors, as well as attack vectors or attack surfaces or other vulnerabilities, and for mitigating or preventing or eliminating such security risks.

Figure 1:
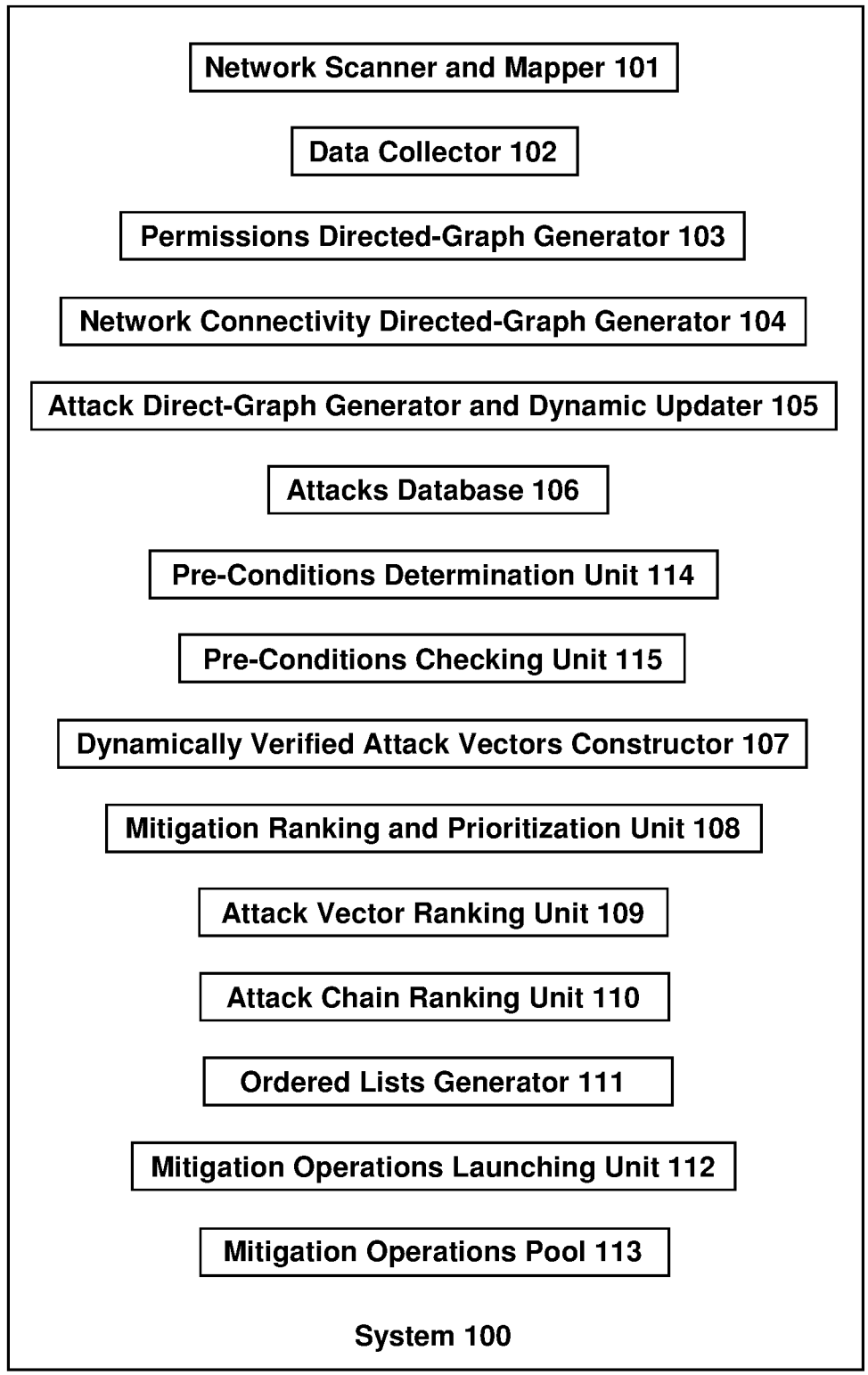
FIG. 1 is a schematic block-diagram illustration of a system, in accordance with some demonstrative embodiments.

Reference is made to FIG. 1, which is a schematic block-diagram illustration of a system 100, in accordance with some demonstrative embodiments. System 100 may be implemented using a suitable combination of hardware components and/or software components.

System 100 may be configured and operable for detecting or determining or estimating attack vectors (or surfaces) or cyber-attack vectors (or surfaces), or vectors or surfaces of attacks or cyber-attacks or vulnerabilities or vulnerability chains or security-related chains; as well as the automatic filtering, sorting, ordering, prioritizing, scoring and/or ranking of such attack vectors or attack surfaces or attack chains; and determining the N most probable, or the top M percent of them based on probability, of such attack vectors or attack surfaces or attack chains; thereby enabling an Information Technology (IT) system or infrastructure or network to direct one or more attack-prevention processes or attack-mitigation processes or attack-mitigation resources towards those particular N or M highly-probably or more-probably or most-probably attack vectors or attack surfaces or attack chains.

For example, a Network Scanner and Mapper 101 performs scanning and/or probing and/or mapping of an organizational network or system or computerized platform. A Data Collector 102 collects data from nodes or elements or devices that are part of such network or system or platform, or that are otherwise operably associated with (or are in wired communication with, or are in wireless communication with) nodes or elements or devices that are part of such network or system or platform; including, but not limited to, devices and/or nodes and/or elements that are physically co-located within a same physical venue (e.g., within a single office space in a single building), and/or that are co-located within two or more nearby venues or adjacent venues or neighboring venues (e.g., two or more floors of the same organization in the same building), and/or that are distributed and/or remote from each other (e.g., distributed across multiple venues or locations of the same organization, optionally include remote offices or devices, satellite offices, field offices, field devices, headquarters offices, regional offices, work-from-home devices, portable devices, or the like). In some embodiments, the scanning of the network and/or the data collection may be performed by (or, may be replaced with), querying one or more central repositories that may hold and provide the requested information. For example, Active Directory (AD) service or server (e.g., for Microsoft® Windows® networks) may store and may provide the information about machines, users, and roles. The Lightweight Directory Access Protocol (LDAP) may be used to query the AD and to obtain the relevant information. With regard to linking users to machines, one or more suitable techniques may be used, for example, looking at roles (permissions) and checking which users are logged on to which machines.

For example, the Network Scanner and Mapper 101 may generate a list or a data-set or other representation of devices, such as, a web server, an application server, a laptop computer of a first user, a desktop computer of a second user, a mobile phone of a third user, a network-connected laser printer, a wireless inkjet printer, or the like. The Data Collector 102 may further collect and store data or meta-data about each device; for example, data indicating that the laptop computer of the first user is of a particular make and model, and runs a particular type and version and build of Operating System, and has a particular processor, and runs a particular web-browser having a particular version number; and that the desktop computer of the second user has other particular properties, and also has a particular graphic editing application having a particular version number and also has a particular video chat application having a particular version number; and that the wireless inkjet printer is of a particular make and model, and runs a particular version of firmware, and utilizes a particular type of Wi-Fi encryption; and so forth.

A Permissions Directed-Graph Generator 103 analyzes the network map and the collected data, and generates a directed graph (or other data-set or list or representation) of Permissions that each node or element or device has. The Permissions directed graph G1 may indicate or represent all the permissions that were discovered for that network. For example, G1=(V1, E1), wherein G denotes directed graph, V denotes vertices, E denotes edges; wherein each vertex (v) in V1 represents an entity within the network, and wherein each edge (e) in E1 represents a relationship between the 2 vertices. For example, e=(v1, v2), wherein v1 represents a particular user and v2 represents a particular machine, and the edge e represents the relationship that v1 is an Administrator on machine v2.

For example, a list of the entities that are represented as nodes of V1 may be: Computer; User; Group; Password; File; Folder; Software; Database; Web Application; Vulnerability; Process; Active Directory; Group Policy; Organizational Unit; Mailbox; Security Control/Agent; or the like.

For example, a list of permissions that are represented as edges in E1 may express one or more of the following relationships:

User -Admin→Computer
   User -Member→Group
   User -Has→Password
   ActiveDirectory -Manage→User\Computer\Group
   Computer -Run→Service
   User -Read\Write\Full Control→Any asset
   Computer -Cache→User A Network Connectivity Directed-Graph Generator 104 analyzes the network map and the collected data, and generates a directed graph G2 (or other data-set or list or representation) of network connectivity. In this directed graph, G2=(V2, E2), wherein each vector (v) in V2 represents a communication element within (or of) the network, and wherein each edge (e) in E2 represents an existing open connection between the two nodes. For example, e=(v1, v2) indicates that v1 represents a first particular machine, and v2 represents a second particular machine, and the edge (e) represents that there is an open connection (or an active connection, or an available connection, or an accessible direct communication route, which may be wired or wireless) between v1 and v2.

For example, a list of the communication elements that may be represented as nodes of V2 may include: Computer; Subnet; Router; Firewall; or the like.

For example, a list of open connection types that may be represented as edges in E2 may include:

Computer-PORT→Computer
   Computer-SUBNET→Subnet

Figure 2:
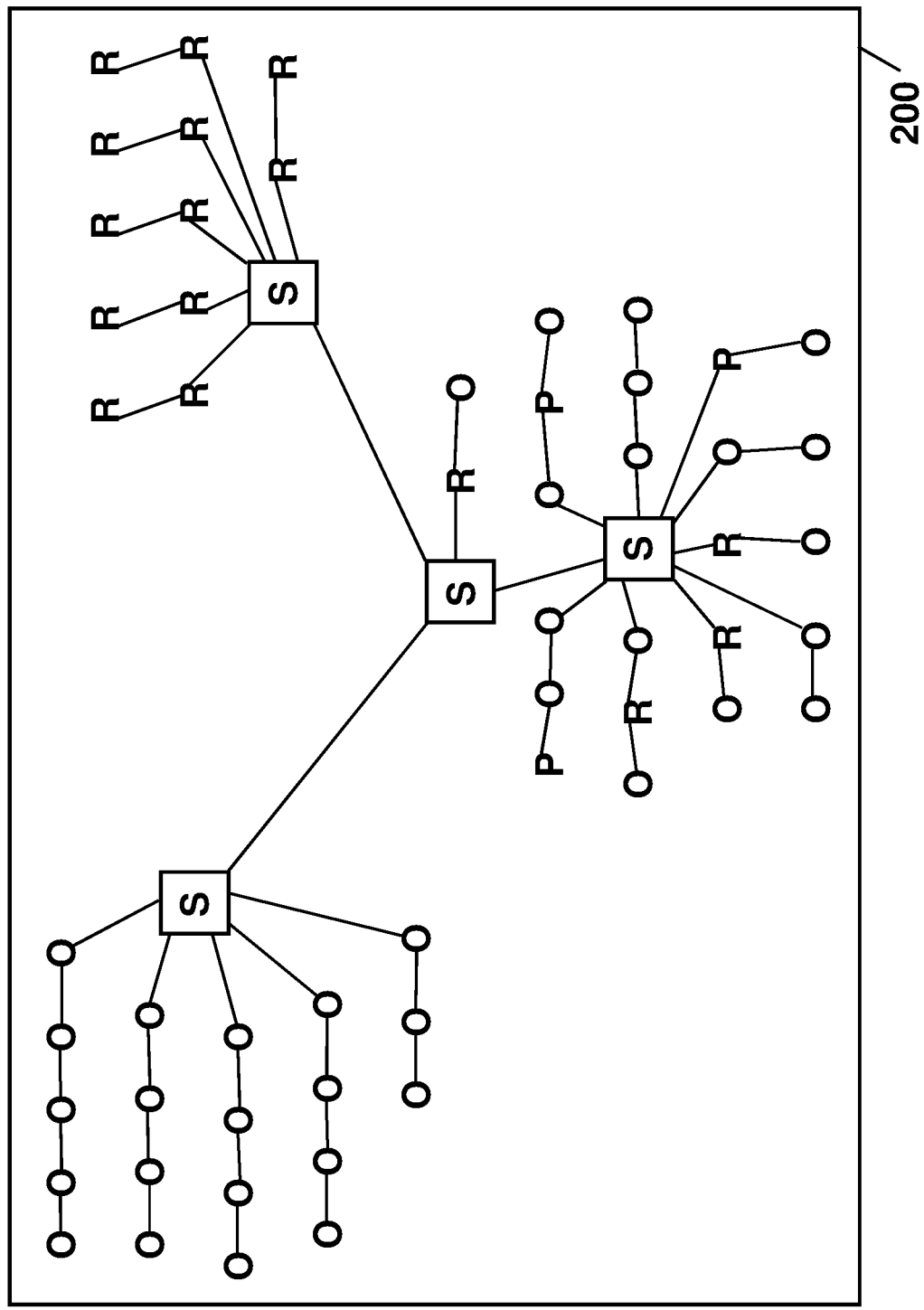
FIG. 2 is a schematic illustration of a Network Connectivity Directed-Graph, which may be generated and/or utilized in accordance with some demonstrative embodiments.

Reference is made to FIG. 2, which is a schematic illustration of a Network Connectivity Directed-Graph 200, which may be generated and/or utilized in accordance with some demonstrative embodiments. For example, nodes marked with "S" are Segments; nodes that are marked as "O" or "P" or "R" are nodes or network elements or network entities of different types (e.g., each "O" being a laptop computer, each "P" being a desktop computer, each "R" being a server computer, or the like); edges between machines and segments represent a wired connection or a wireless connection; edges between segments represent logical connectivity enforced by a firewall or by other network control device or by other device that monitors and controls incoming and/or outgoing network traffic. The system and method of the present invention may query and/or scan the network, and may generate a digital representation that corresponds to such network-connectivity directed-graph or similar diagram or network map.

Referring back to FIG. 1, system 100 further comprises an Attack Direct-Graph Generator and Dynamic Updater 105. It generates, and dynamically updates and modifies, a directed graph G3=(V3, E3), wherein G3 represents possible combinations of attack techniques (e.g., including, but not limited to, attacks that are described in an Attacks Database 106 or a similar vulnerabilities database or cyber threats database, such as MITRE ATT&CK® or other databases or knowledge-bases), mapped to the particular enterprise network that is represented in directed graphs G1 and G2. Optionally, a Pre-Conditions Determination Unit 114 may be used to determine the pre-conditions or prerequisites for each particular Attack Technique; and a Pre-Conditions Checking Unit 115 may later check (e.g., during the static verification stage and/or during the dynamic verification stage) whether the required pre-conditions for a specific Attack Technique hold true.

The updating of the attacks directed-graph G3 may be performed, for example, at pre-defined time-intervals (e.g., every 60 minutes), or at pre-defined time-points (e.g., every Monday and Thursday), or upon a triggering event or upon detecting that a triggering condition holds true (e.g., upon detection that a new laptop computer was added to the mapped network; upon detection that a new video chat software was installed on a particular tablet), or on-demand in response to a user (e.g., system administrator) command to update the attacks directed graph G3.

In some embodiments, a Static Verification process may be used in order to construct all attack techniques in G3 (e.g., without context).

For example, a "State" is a vertex representing either a machine or user.

For example, a "Chain" is a particular sub-graph (or, a particular graph-portion) having three nodes that are connected by two directed edges; wherein:

Let C=(a,b,c,d,e) be a chain.
   C.a represents the source state
   C.c represents the attack technique
   C.e represents an end state
   C.b is a directed edge connecting a to c
   C.d is a directed edge connecting c to e For example, "SV-t" may be defined as: for a particular Attack Technique "t" (e.g., from the Attacks Database 106), the function SV-t (start) is a specific function that implements a Static Verification logic and that returns a set of end states E, such that, for every state e in E, the function SV-t has successfully Statically Verified the transition from state "start" to "e" via technique "t".

In some embodiments, the attacks directed graph G3 may be generated (e.g., having nodes representing states, and having nodes representing attack techniques) in accordance with a process implementing the following code or pseudo-code or algorithm.

```
Nodes: V = all states are vertices in G1
Edge generation:
For any technique t in the Attacks Database
    For every s in V
        E = SV-t(s)
        For every e in E
            Add a new instance of node t to V
            Add edge (s,t)
            Add edge (t,e)
        End
    End
End
```

A Dynamically Verified Attack Vectors Constructor 107 operates to perform dynamic verification: utilizing the list of chains in G3 (e.g., start state; end state; attack technique), dynamic verification is applied in order to verify that for a given context it is possible to construct or generate or estimate the attack vector. For example, for each attack chain, the context determines the associated machine and user, and determines accordingly the respective connectivity and permissions (e.g., that are required to exist or to be available in order to such Attack Chain to be successful or potentially-successful).

The Dynamically Verified Attack Vectors Constructor 107 may operate in accordance with a process implementing the following definition as well as the following code or pseudo-code or algorithm.

Path P (s, g) in G3 is an ordered sequence of chains $C_1, \ldots C_n$, wherein "s" is the first state of $C_1$, wherein "g" is the last state of $C_n$; wherein the chains, when followed orderly (from $C_1$ to $C_n$), constitute a valid directed path in G3 from "s" to "g".

Context=C is a pair, wherein "m" is a machine and "u" is a user (and its permissions); their notations are "C.m" and "C.u".

Attack Chain T (S, G): given a start context S, and given a particular attack technique T (e.g., from the Attacks Database 106), an adversary or an attacker is able to exploit the particular attack technique T in order to successfully reach context G.

Attack Vector AV (S, G): is a sequence of attack chains, $T_i (S_i, G_i)$, for i=1 to n; wherein S=$S_1$, wherein $G_n$=G, and wherein for all i=2 to n, $S_i$=$G_{i-1}$.

Demonstrative pseudo-code or algorithm which may be used, in some embodiments, for generating the Dynamically-Verified Attack Vectors:

```
GenAV(m, st,ed): Construction of all dynamically verified
attack vectors AV(S,G)
    /*  m is the machine of the starting point -
        if st is a machine then m=st  */
    /*  st is either machine or user of S
        ed is either a machine or user in G  */
    Run BFS on G3 returning P,
    wherein P = all possible paths from st to ed
        If P is empty
            return
        Else
        Allocate AV(st,ed) as all AV header from st to ed
        For each path p in P
            /*  p = C1,...,Cn  */
            /*  generate a single
            AV(S,G) = (T1(S1,G1,),...,Tn(Sn,Gn))  */
            /*  each Ci = (a,b,c,d,e)  */
            Allocate AV(st,ed,p) to be used as
                the header for p linked to AV(st,ed)
            Let p = C1, C2, .. Cn
                Current-machine = m
                If st is a user
                    Current-user = st
                Else
                    Current-user = an admin account in machine m
                For I = 1..n
            If Ci.a is a machine
                Si.m = Ci.a
                Si.u = Current-user
            Else
                Si.m = Current-machine
                Si.u = Current-user
                    Ti = C1.c
                    If Ci.e is a machine
            Gi.m = Ci.e
            Gi.u = Current-user
            Else
            Gi.m = Current-machine
            Gi.u = Ci.e
            If Si.m can-NOT access via the network Gi.m
            SKIP
            If Si.u has NO permissions to apply Ti on Si.m
                SKIP
            Add Ti(Si,Gi) to AV(st,ed,p)
            Current-user = Gi.u
            Current-machine = Gi.m
                End      /* for */
                Add AV(st,ed,p) to AV(st,ed)
        End            /* for each p */
        Return AV(st,ed)
```

A Mitigation Ranking and Prioritization Unit 108 may perform ranking and prioritization of mitigation operations, using (or based on, or taking into account) the dynamically-verified attack vectors, in order to detect or determine the riskiest or the highest-risk attack vectors. The Applicants have realized that conventional attack mitigation processes fail to take into account the network context and/or the business context, and thus tend to overload security teams and security-related resources with large amount of unnecessary workload, sometimes incorrectly flagging impossible attack vectors as real attack vectors or even as critical threats. In contrast, the system and method of the present invention takes into account only the dynamically verified attack vectors, and thus ensures that the verified network context allows the attack vector to execute and hence poses a real security risk that should be addressed and mitigated.

Furthermore, some embodiments of the present invention utilize (e.g., for mitigation ranking and prioritization) a logic that follows or mimics or emulates the logic that is typically utilized by attackers or adversaries and their thought process. For example, the Applicants have realized that many or most adversaries or attackers search for, and utilize, a relatively short or shortest path(s), taking into account the reliability of their tools and considering detection chances; and these considerations may be taken into account by the system and method of the present invention, which then estimates the most likely attack vector(s) that adversary would choose and allocates a high priority score or a high ranking to such attack vector(s); while allocating a low ranking or a low priority score to an attack vector that is cumbersome to execute, and/or that involves a long path or a longer path or the longest path, and/or that requires the attacker to utilize an attack tool that is known to have a high probability of being detected.

An Attack Vector Ranking Unit 109 may operate to rank the priority or the related priority or the estimated probability that a particular Attack Vector would be applied.

For example, the Rank of an Attack Vector may be defined as: the sum of the ranks of the attack chains that are included in the Attack Vector. As described above, Attack Vector AV (S,G) is a sequence of attack chains Ti (Si, Gi) for i=1 . . . n, wherein S=S1, and wherein Gn=G, and wherein for all I=2 . . . n, Si=Gi−1.

The Rank of an Attack Chain may be determined by an Attack Chain Ranking Unit 110, which may determine it as follows:

Rank (Ti (SI, GI)=1+Reliability (Ti)*Stealthiness (Ti)

For example, Reliability (Ti) is a parameter having a value in the range of 0 . . . 1, indicating the reliability of a particular attack technique, or indicating the level of success that is estimated to be achieved from using said attack techniques; wherein (for example) 0 indicates maximal reliability, and 1 indicates extremely low reliability.

For example, Stealthiness (Ti), or stealth-level, or stealth-score, is a parameter having a value in the range of 0 . . . 1, indicating the stealth level of a particular attack technique, or indicating the level of capability of that attack technique to be stealthy and non-detected by attack detection tools or by cyber security tools or teams; wherein (for example) 0 indicates maximal stealth level (e.g., minimal estimated probability that this attack technique would be detected), and 1 indicates extremely low stealth level (e.g., maxima probability that this attack technique would be detected).

In some embodiments, the Rank of an Attack Chain is in the range of 1 . . . 2. In other embodiments, other ranges-of-values may be utilized for the above-mentioned parameters. In some embodiments, optionally, one or more coefficients or weighting coefficients may be used, or a weighted formula may be used, in order to allocate a particular greater or smaller weight to one, or some, of the parameters.

Accordingly, the Rank of an Attack Vector, Rank (AV(S, G)), is the sum of Ranks (Ti(Si,Gi)) for I=1, . . . , n.

In some embodiments, the Rank of an Attack Vector (having "n" Attack Chains) is in the range of n to 2n; and the smaller the Rank value of an Attack Vector is, the greater is the estimated probability that this Attack Vector would be utilized against this network.

In some embodiments, optionally, one or more, or some, of the Ranks of the Attack Chains, may be given a greater weight (or a smaller weight, or an otherwise different weight) relative to one or more other Ranks of Attack Chains; such that, for example, the Rank of an Attack Vector may optionally be calculated using a weighted sum, or other type of weighted formula, rather than an algebraic sum. For example, one or more particular Attack Chains, may be allocated by the system a particular coefficient that increases (or decreases) their relative weight in the calculation of the Rank of the Attack Vector, due to one or more pre-defined conditions that hold true or due to one or more other triggering events, or due to an ad hoc request or command from a security team to allocated an increased (or decreased) weight to an Attack Chain that includes (or that excludes) a particular vulnerability or characteristic.

The Mitigation Ranking and Prioritization Unit 108 may then proceed to determining a mitigation priority, or a mitigation priority rank or score, for each dynamically verified Attack Vector. A mitigation operation is an operation, or a set of operations, that are able to mitigate or cure or stop a particular attack technique (e.g., represented in the Attacks Database 106). For example, the Mitigation Ranking and Prioritization Unit 108 may take into account the number of attack vectors that are estimated to become obsolete once a mitigation operation is activated or applied. The Mitigation Ranking and Prioritization Unit 108 assigns or allocates a higher priority to a mitigation operation that is able to address, or cure or block, a greater number of attack vectors. In accordance with some embodiments, a attack techniques characterize attack chains; and therefore given a particular attack technique, the system and method of the present invention may count the number of attack vectors that are included in (or are associated with) that particular attack technique.

For example, the Attack Vector AV (T) for an attack technique T, is the set of attack vectors containing at least one occurrence of an attack chain having attack technique T.

In some embodiments, the Rank of an attack technique, Rank (T), may be calculated as:

Rank (T)=SUM 1/Rank(AV) for all the Attack Vectors AV in AV(T)

Other suitable calculations or formulas may be used, in accordance with some embodiments of the present invention.

In some embodiments, the priority of a mitigation operation is ordered or is calculated, such that a higher value of Rank(T) indicates a higher priority for that mitigation operation.

An Ordered Lists Generator 111 operates to generate, output, store and/or transmit one or more ordered lists of Attack Vectors and/or of Attack Techniques and/or of Mitigation Operations, ordered based on their respective rank values. For example, the Ordered Lists Generator 111 may generate a list of the N mitigation operations (e.g., the 5 or the 8 mitigation operations having the highest rank values; or, may generate a list of the top M percent of mitigation operations having the highest rank values; or, may generate a list of the N attack vectors and/or the N attack chains having the lowest rank values; or, may generate a list of the M percent of the attack vectors or the attack chains having the lowest rank values; or the like.

In some embodiments, optionally, a Mitigation Operations Launching Unit 112 may operate to automatically or semi-automatically cure or handle or address the top N or the top M items on said ordered lists, or to launch or trigger or activate the N or the M top-ranked mitigation operations. In some embodiments, the mitigation operations may be automatically and/or autonomously deployed by the system, by selecting and deploying particular operations that are indicated or represented in a Mitigation Operations Pool 113, which may store, for example, software patches, software updates, automatic scripts, batch processes, pre-defined code or subroutines or functions, or the like. In some embodiments, one or more of the selected mitigation operations may be deployed subject to a manual approval by a human administrator, or by an Artificial Intelligence (AI) based security administration module or unit.

The system and method of the present invention may be utilized by Breach & Attack Simulation (BAS) vendors or providers or platforms, and may offer accurate and/or efficient risk prioritization and/or mitigation prioritization; for example, by generating output and insights that may focus security teams and/or mitigation resources on the riskiest issues, and/or by identifying or classifying certain risks as "non issues" which should not be handled or mitigated (at all, or not urgently, or not within a particular time-slot); thereby ensuring optimal or efficient allocation and utilization of security resources and/or threat mitigation resources.

The Applicants have realized that conventional methods for validating whether a given network is protected from a certain attack vector, typically utilize Penetration Testing (PT), in which the specific attack vector is executed, and thus checking whether a threat response is in place for that particular attack vector. However, realized the Applicants, PT may suffer from complexity, since a great amount of coordination may be required for proper PT; for example, setting the rules of engagement, defining exact PT scope, handling false positive alerts generated due to the PT, or the like; which in turn translate to increased cost, leading to selective or sporadic use of PT, thereby leaving many areas or attack vectors untested. Additionally, realized the Applicants, PT reflects, at most, a specific point-in-time result, and needs to be re-applied over and over to obtain fresh test results, which may be not feasible due to budget constraints, resources constraints, or the like.

The Applicants have realized that BAS is an attempt to overcome these limitations, by automating penetrations via simulations. However, although BAS is applied to broader areas of the enterprise network, it still provides limited coverage of the risk vectors due to various. For example, in many cases, a vulnerability or misconfiguration allows multiple alternative exploitation routes; however, conventional simulations typically implement a single exploitation route, not covering the alternative routes, and thus providing only partial verification. Furthermore, as in the PT case, up-front coordination efforts for planning and scoping prior to running the simulation are often required. Additionally, BAS systems may be extremely sensitive to the deployment breadth, such that extending coverage may typically mean deployment of additional agents, which increases friction with Information Technology (IT) and business units. The increased need for coordination, and/or potential conflicts with production systems, practically lead to non-frequent and offline execution of such tests. Furthermore, simulations do run code that affect the network and its devices, and thus it is likely that business interruption incidents may happen. In addition, detection systems may generate false positive errors, that in turn cause additional work for Security Operations Center (SOC) analysts.

The Applicants have realized that the limited coverage scope of conventional methods implies lack of a global view of the cyber risk, and puts security teams in the position where they cannot be sure that all the potential risks and threats and attack vectors were analyzed; and therefore cannot tell if the major risk factors are being taken care of or mitigated. This limitation may lead to incorrect prioritization and sub-optimal allocation of the limited security resources and threat mitigation resources.

The system and method of the present invention may provide complete, real time, and accurate verification of protection against any attack vector, using (or based on) an attacks repository or an attacks database (e.g., the MITRE ATT&CK framework), across the entire enterprise and including on-premises as well as cloud-based devices and networks. The system operates to cross-references ATT&CK framework models with the findings from the actual network being scanned or mapped, to determine the susceptibility to all attack techniques, avoiding execution of any simulations or penetrations, and enabling real-time prioritization of attack vectors and of threat mitigation resources.

The system of the present invention may generate a comprehensive network map, which holds or represents all network assets, such as: devices and their configurations; network topology and connectivity; user permissions. Based on the map, the system may accurately analyze the viability of any attack technique from any source asset to any destination asset, without a need to run a simulation or a penetration test.

The system of the present invention may determine the viability of an attack technique. During a reconnaissance phase, adversaries explore existing penetration opportunities to improve their reach to ultimately gain access to their prime objective. Each action that an adversary may take may optionally require one or more pre-conditions and/or pre-requisites to exist before it can be effectively executed. The system of the present invention may include and may utilize, for each tactic and attack technique, descriptors of such pre-conditions and/or prerequisites, which are taken into account when estimating the viability of a particular attack technique.

In accordance with the present invention, given a source device and a destination device, the system checks or verifies whether a particular attack technique is viable; for example, by checking whether or not the specific pre-conditions or prerequisites hold true (e.g., for both the source device and the destination device; or for one of them, based on relevancy or context). The system may analyze all possible combinations of source device, destination device, and attack technique; and may thus reach full coverage of all possible attack scenarios for a given enterprise or organization or network. For example, a system having 30,000 devices may have approximately 900,000,000 combinations of pairs of devices, and such order-of-magnitude cannot be accommodated or handled (at all, or efficiently) by a conventional BAS system. The system may thus transform the heavy penetration (simulation) challenge into a data analysis process which enables full-scale threat verification.

As a demonstrative example, the system of the present invention may estimate whether a particular network or its devices are exposed to a "Pass the Hash" (PtH) attack technique, in which lateral movement is performed between or among Microsoft® Windows® computers without having access to the user's cleartext password. The Applicants have realized, and the system of the present invention may define, that a successful PtH attack requires several pre-conditions to hold true, such as: (a) Two computers (source and destination) need to have a local user with the same credentials (e.g., due to a "golden image" or default passwords that are not changed); (b) The user must be enabled on the destination computer; (c) If the operating system of the destination computer is Microsoft® Windows® version 7 or higher, with Security Update KB2871997 installed, this attack is limited to the built-in administrator account (RID-500); (d) The destination computer is configured to allow remote administration; (e) The port of the remote administration is open between the source and the destination computers. Accordingly, the system of the present invention may actively check, whether these pre-conditions hold true with regard to a particular pair of devices on the network; and may thus determine whether a PtH attack is viable between them.

In some embodiments, the network scanning and mapping, and other map information gathering, may utilize discovery technologies that mimic hacking reconnaissance techniques, and may obtain the information with no need to integrate with any other system. For example, the system of the present invention need not rely on full access to Active Directory (AD) domain controllers, but rather, may ask for a domain user with read-only access privileges. The system may further use remote querying capabilities at the operating system level. Information gathering, and network mapping and scanning operations, are executed continuously in the background (or, at pre-defined time intervals), in order to identify system changes as soon as they occur. The system may be deployed or implemented using a single device within the network, without installing or operating any "agents" or "agent modules" on other devices, and without requiring any special privileges. The system may effectively determine whether a particular attack technique is possible, by mapping all the computers or devices in the network and analyzing their configuration, patch level, and their associated users, to determine in a non-disputed way whether or not a particular attack technique (e.g., PtH) is feasible.

The system may provide top down risk prioritization, based on broadest coverage, 24/7 real time scanning and response, and may maximize efficiencies of SOC teams as well as reduce their workload, in a scalable solution leading to optimal mitigation prioritization. The system is able to analyze All possible combinations of source device, destination device, and attack technique, and is able to check whether each particular attack technique is viable with regard to each and every pair of source and destination devices. This comprehensive analysis ensures that the prioritization process takes into account all information and covers all assets and devices and users. Due to the minimal footprint of the system, with no need for agent deployment, it is possible to reach maximal coverage at low cost and with minimal friction, thereby overcoming the limitations of conventional BAS products which view only a narrow window of the outstanding risks and not necessarily the important ones.

In some embodiments, the analysis does not require any up-front scheduling or planning, and may thus run 24/7 continuously without requiring any coordination. Such continuous operation guarantees that any change performed, or any new security advisory announced, is immediately reflected in the risk evaluation. Some relevant change triggers include, for example: Changes to computer settings and configuration; Grant of network access; Grant of user permission; Creation or addition of users; User logins to computers, systems and applications; Password changes, password resets; Changes to password policies; User activity (e.g., creating or deleting or modifying files); Addition of new services and their configurations (e.g., databases, web applications).

The system and method of the present invention may increase SOC team efficiencies; and/or may reduce load and may bring improved efficiencies to SOC teams and SOC resources. The system may provide improved or enhanced or optimal resource allocation and resource utilization, by pointing out the most critical issues in real time so that the threat mitigation resources and team can focus on the most pressing needs and minimize the exposure time; and by proving that many theoretical or "on paper" attack techniques are not actually viable against this particular network, i.e., cannot be exploited, thereby supporting informed decision taking and also eliminating unnecessary mitigation work. In some embodiments, the system has fully automatic operation, requiring no (or minimal) manual intervention or handling; and no dependencies on other information systems and integrations. The system requires no business disruption, as it conducts neither penetration tests nor simulations; thus there is no need for planning or scheduling of such activities, thereby eliminating the need to coordinate with business units, and eliminating business disruption. The system may operate in a noise-less mode of operation, and no detection rules or Security Information and Event Management (SIEM) rules are likely to be triggered due to the operation of the system of the present invention. Therefore, in contrast with simulation engines, the SOC team will not need to distinguish between (I) "real" findings of actual threats, and (II) "noise" generated due to such testing or simulations, and can thus avoid Chain of Trust challenges.

The system may be utilized via light touch deployment and operation, optionally by utilizing a single server computer or desktop computer or laptop computer, which may be configured to have minimal network permissions and a domain user with a read-only access to Active Directory. The system may be implemented as "Software as a Service" (SaaS) platform, which moves the management and dash-boarding component to a cloud-based computer, thereby further minimizing the on-premises footprint. The system does not require and does not utilize any "agent module" installation on workstations or computers or servers of the organization, since all required information may be obtained by the system via communication with OS components using network protocols such (e.g., SMB, LDAP, SSH, and/or other protocols). The system may operate seamlessly and/or transparently, without any effect on business processes and/or on the SOC operations, and with negligible impact on the network load; and such light touch deployment and operation may eliminate or reduce the need for IT and security teams coordination.

Figure 3:
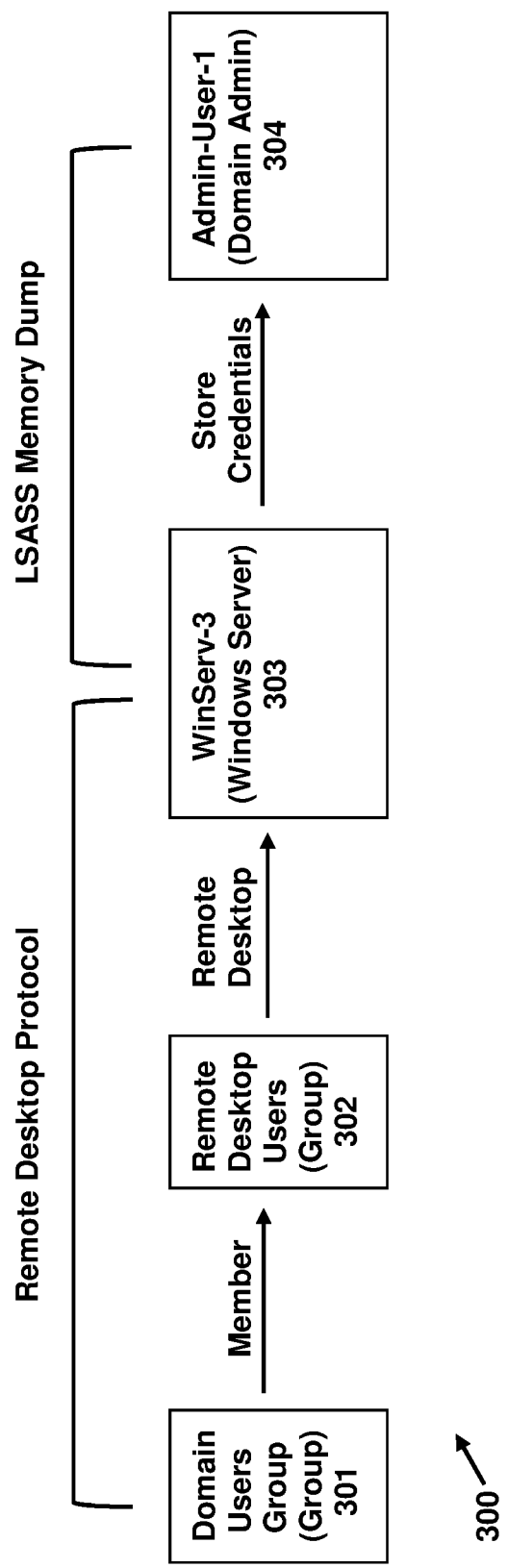
FIG. 3 is a schematic illustration of a diagram of threat detection and threat analysis, which may be generated and/or utilized in accordance with some demonstrative embodiments.

Reference is made to FIG. 3, which is a schematic illustration of a diagram 300 of threat detection and threat analysis, which may be generated and/or utilized in accordance with some demonstrative embodiments. This diagram demonstrates a two-step attack chain or a two-phase attack chain, in which a domain user obtains credentials of, and can become, a domain administrator; namely, a chain of two attack techniques that a domain user may apply to obtain credentials of a domain administrator. This attack vector or attack chain includes two attack techniques. A first attack technique exploits Remote Desktop Protocol (RDP); for example, a "Domain Users" group (box 301) is a member of the "Remote Desktop Users" group (box 302) on a WinServ-3 Windows server machine (box 303), and therefore the system of the present invention determines that it is possible to remotely log-in into WinServ-3 (e.g., the system of the present invention also verifies that a connectivity exists, to ensure that the connection is allowed), via a remote desktop protocol and/or other suitable technique. A second attack technique exploits "LSASS Memory Dump", such as, dumping the memory (using a credential dumper or harvester module, such as Mimikatz), or extracting or harvesting credentials, once a user logs-in interactively. The system of the present invention may therefore determine that a regular domain user in any computer, if his computer has network access to machine WinServ-3, can log into it, and once logged-in can apply the tool Mimikatz (or other memory dumper or credentials harvesting tool) to obtain the password of a domain administrator, thereby practically obtaining access as the Domain Admin (box 304).

Figure 4:
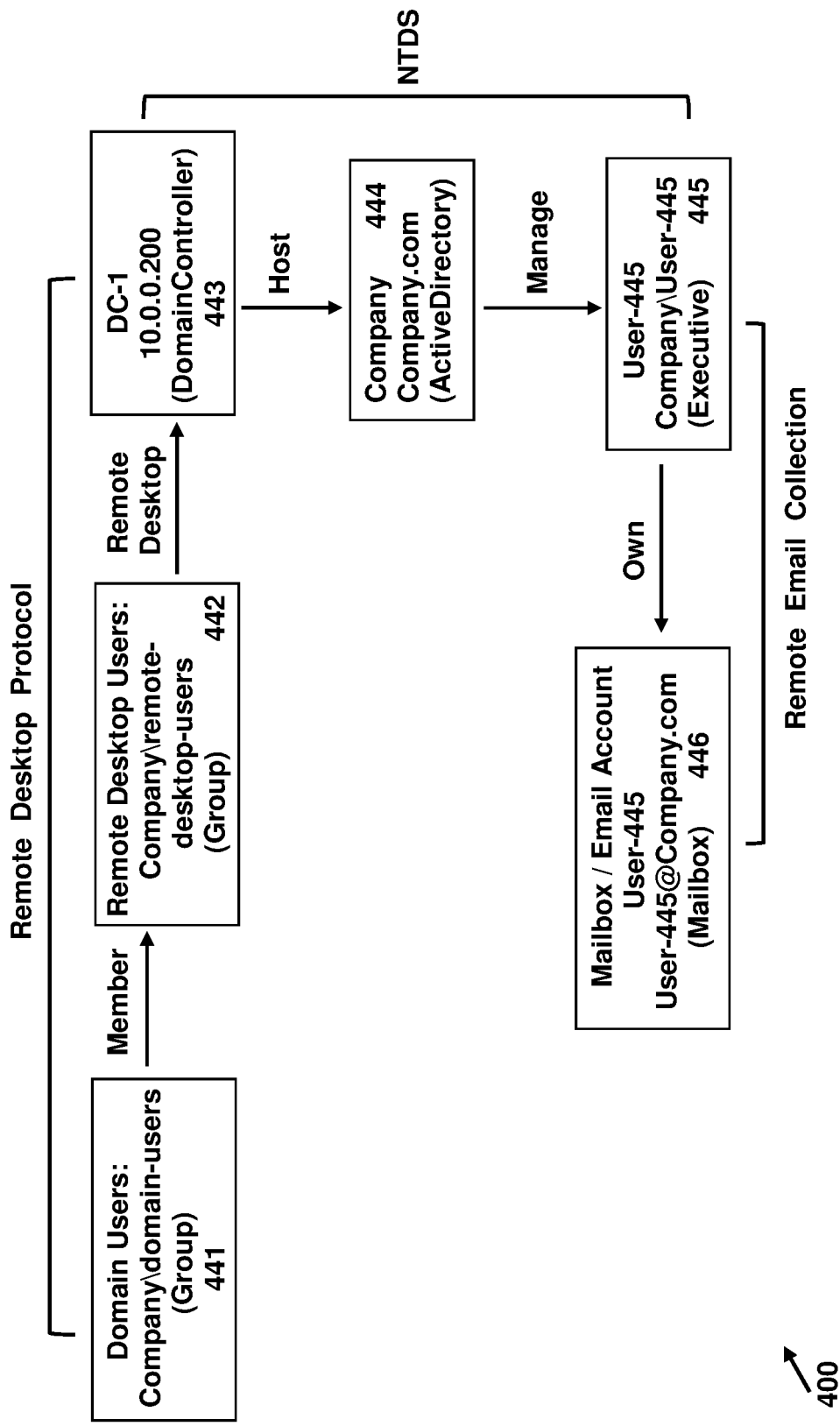
FIG. 4 is a schematic illustration of another diagram of threat detection and threat analysis, which may be generated and/or utilized in accordance with some demonstrative embodiments.

Reference is made to FIG. 4, which is a schematic illustration of another diagram 400 of threat analysis, which may be generated and/or utilized in accordance with some demonstrative embodiments. This diagram demonstrates a multi-step attack vector in which domain users obtain access to email accounts of executives in the organization.

For example, the system of the present invention detects that Remote Desktop Protocol (RDP) is enabled on computer "DC-1" (box 443); and further detects that the "Domain Users" group (box 441) is a member of "Remote Desktop Users" group (box 442) on computer "DC-1" (box 443); and further detects that computer "DC-1" (Domain Controller) listens to incoming connections on port 3389;

and therefore, the system determines that a regular domain user can log into computer DC-1.

Then, with regard to NTDS file or object, the system of the present invention detects that the Domain Controller "DC-1" stores the file "C:\Windows\NTDS\ntds.dit"; and that adversaries may attempt to access or create a copy of the Active Directory domain database from the Active Directory of the organization (box 444) in order to steal credential information, as well as obtain other information about domain members (e.g., such as devices, users, and access rights); one or more tools or techniques can be used to enumerate the NTDS file and the contents of the entire Active Directory hashes (such as: Volume Shadow Copy; secretsdump.py; using the in-built Windows tool, ntdsutil.exe; Invoke-NinjaCopy; or the like), and these tools require administrator privileges to execute; however, the system further determines that using Visual Basic, which is enabled, the domain computer "DC-1" is configured such that using a "Sticky key" method it is possible to elevate the domain user to an administrator; and once the user runs as administrator, using one of the above tools, he would be able to obtain the password hashes and identify the hash of an executive in the organization (e.g., "User-445", box 445). Then, the system of the present invention determines that remote email collection can be exploited: Once the password hash of "User-445" is available, the adversary can access the email server with that password hash, and can access that executive email mailbox (box 446).

The above-mentioned diagrams are demonstrative non-limiting examples of the capabilities of the system and method of the present invention; which may be configured and may operate to detect other types of attack chains.

Some embodiments provide a computerized method comprising: (a) scanning and mapping a network, of an organization or a venue or a domain; and collecting data and meta-data about network elements of said network; (b) generating a Permissions Directed-Graph (G1), which indicates permissions that each network element has; wherein each vertex in the Permissions Directed-Graph (G1) represents a network element; wherein each edge in the Permissions Directed-Graph (G1) represents a relationship between two network elements; wherein the Permissions Directed-Graph (G1) represents at least whether a particular user has or does not have access to a particular machine; (c) generating a Network Connectivity Directed-Graph (G2), which indicates accessible direct-communication routes between network elements; (d) obtaining a list of attack techniques; and applying a Static Verification process on the list of attack techniques, to generate an initial version of an Attacks Directed-Graph (G3) which maps particular attacks to network elements that are represented in the Permissions Directed-Graph (G1) and in the Network Connectivity Directed-Graph (G2); wherein the Static Verification process comprises generating an initial list of all relevant cyber-attack techniques regardless of context; (e) performing a Dynamic Verification process on said initial list of all relevant cyber-attack techniques, and constructing an updated list of dynamically-verified Attack Vectors that were verified as being available within a particular operational context; (f) generating a Ranking for each dynamically-verified Attack Vector in the updated list of dynamically-verified Attack Vectors; (g) based on rankings generated in step (f), performing prioritization of the dynamically-verified Attack Vectors and performing prioritization of threat mitigation resources; (h) activating one or more threat mitigation resources, based on one or more prioritization outputs generated in step (g).

In some embodiments, step (a) comprises: querying an Active Directory (AD) service, which stores data and meta-data about machines in said network, about users in said network, and about roles in said network; generating links between users and machines in said network, by analyzing roles and permissions in said network and by checking which users are logged-on to which machines.

In some embodiments, said querying is performed via a domain user which has read-only access privileges towards the Active Directory (AD) service, without full read-and-write access to the Active Directory (AD) service, to reduce risk to said network.

In some embodiments, step (c) generates said Network Connectivity Directed-Graph (G2) having vertices; wherein a node of a vertex in the Network Connectivity Directed-Graph (G2) represents an object from a pool of objects that includes at least: a computer.

In some embodiments, step (c) generates said Network Connectivity Directed-Graph (G2) having vertices; wherein a node of a vertex in the Network Connectivity Directed-Graph (G2) represents an object from a pool of objects that includes: a computer; a user; a group of users; a password; a file; a folder; a software application; a database; a web application; a vulnerability; a process; an Active Directory (AD) server; a group policy; a mailbox; a cyber-security unit; a router; a subnet; a port; a firewall.

In some embodiments, step (d) comprises: performing a pre-conditions checking process, to check whether or not a pre-condition for applying a particular Attack Technique holds true with regard to a particular network element; if the checking result is negative, then: excluding said Attack Technique from the Attacks Directed-Graph (G3).

In some embodiments, at least one of step (d) and step (e) comprises: defining and utilizing States and Attack Chains in the Attacks Directed-Graph (G3), wherein a State is a vertex representing either a machine or a user, wherein an Attack Chain is a particular graph-portion having three nodes that are connected by two directed edges; wherein each Attack Chain is generated as being associated with five parameters which comprise: (i) a Source State, (ii) a particular Attack Technique, (iii) an End State, (iv) a first edge connecting the Source State to the particular Attack Technique, (v) a second edge connecting the particular Attack Technique to the End State.

In some embodiments, step (e) comprises: performing dynamic verification by utilizing a list of Attack Chains in the Attacks Directed-Graph (G3), and by verifying whether or not for a given context it is possible to construct a particular Attack Vector towards a particular user and a particular machine based on available connectivity data and on available permissions data.

In some embodiments, step (e) comprises performing dynamic verification by: defining a Path P (s, g) in the Attacks Directed-Graph (G3), as an ordered sequence of attack chains (C1, . . . Cn), wherein "s" is a first state of C1, wherein "g" is a last state of Cn; wherein the attack chains in said sequence, when followed orderly from C1 to Cn, constitute a valid directed path in the Attacks Directed-Graph (G3) from "s" to "g"; wherein the dynamic verification is performed in relation to a context-pair, wherein each context-pair comprises: (i) a User-Context indicating a user and its permissions, and (ii) a Machine-Context indicating a machine and its connectivity.

In some embodiments, step (f) comprises: determining that a first Attack Chain has a first number of attack segments that are required to carry out a first attack towards a particular machine; determining that a second Attack Chain has a second number of attack segments that are required to carry out a second attack towards said particular machine; assigning a first threat-score to the first Attack Chain, and assigning a second, smaller, threat-score to the second Attack Chain, based on the second number of attack segments being smaller than the first number of attack segments.

In some embodiments, step (f) comprises: defining a first Vulnerability as a vulnerability that is frequently utilized by cyber-attackers; defining a second Vulnerability as a vulnerability that is rarely utilized by cyber-attackers; determining that a first Attack Chain against a particular network element is available in said network due to existence of the first vulnerability; determining that a second Attack Chain against said particular network element is available in said network due to existence of the second vulnerability; assigning a first ranking to the first Attack Chain, and assigning a second, smaller, ranking to the second Attack Chain, since the first Attack Chain utilizes the first vulnerability that is utilized frequently and since the second Attack Chain utilizes the second vulnerability that is utilized rarely.

In some embodiments, step (f) comprises: defining a first Vulnerability as a vulnerability that is exploitable via a first attack tool that has a high probability of being discovered by cyber security protection tools; defining a second Vulnerability as a vulnerability that is exploitable via a second attack tool that has a low probability of being discovered by cyber security protection tools; determining that a first Attack Chain against a particular network element is available in said network due to existence of the first vulnerability; determining that a second Attack Chain against said particular network element is available in said network due to existence of the second vulnerability; assigning a first ranking to the first Attack Chain, and assigning a second, greater, ranking to the second Attack Chain, since the first Attack Chain utilizes the first vulnerability which is exploitable via the first attack tool that has the high probability of being discovered, and since the second Attack Chain utilizes the second vulnerability which is exploitable via the second attack tool that has the low probability of being discovered.

In some embodiments, the method comprises: generating a Ranking of an Attack Vector as a sum of the rankings of the attack chains that are included in said Attack Vector, wherein the Attack Vector AV is a sequence of multiple attack chains.

In some embodiments, the method comprises: generating a Ranking of each Attack Chain of said Attack vector, by: determining a Reliability score for each Attack Chain, indicating and quantifying a level of success of said Attack Chain to achieve an attack goal; determining a Stealth score for each Attack Chain, indicating and quantifying a probability that exploitation of said Attack Chain by an attacker will be discovered by cyber-attack protection tools; determining said Ranking of each Attack Chain of said Attack vector based on a weighted formula that takes into account said Reliability score and said Stealth score.

In some embodiments, step (g) comprises: determining that a first dynamically-verified Attack Vector can be mitigated via a first mitigation operation; determining that a second dynamically-verified Attack Vector can be mitigated via a second, different, mitigation operation;

determining that a third dynamically-verified Attack Vector can also be mitigated via said second mitigation operation; assigning a priority to the first mitigation operation, that is higher than a priority assigned to the second mitigation operation, based on a determination that the second mitigation operation can mitigate a greater number of dynamically-verified Attack Vector relative to the first mitigation operation.

In some embodiments, step (g) comprises: determining rankings to available cyber-attack mitigation operations, based on the number of dynamically-verified Attack Vectors that are estimated to be defeated by deploying each available cyber-attack mitigation operation.

In some embodiments, step (g) comprises: determining that a first Attack Chain is a segment in N different Attack Vectors in said network; determining that a second, different, Attack Chain is a segment in M different Attack Vectors in said network; determining that N is greater than M; and therefore, assigning a greater ranking to (i) deployment of a first mitigation operation that blocks the first Attack Chain, relative to (ii) deployment of a second, different, mitigation operation that blocks the second Attack Chain.

In some embodiments, at least one of step (d) and step (e) comprises: (I) initially tagging a particular Attack Vector as an attack vector that is a threat to said network due to existence of one or more particular Vulnerabilities that said Attack Vector exploits; (II) subsequently, un-tagging said particular Attack Vector as a threat to said network, due to a determination that said vulnerability cannot be exploited due to at least one of: (i) lack of a permission of a particular user to perform a particular operation, (ii) lack of connectivity between two particular network elements.

In some embodiments, at least one of step (d) and step (e) comprises: (i) determining that a first vulnerability exists at a first network element of said network; (ii) determining that a second, different, vulnerability exists at a second, different, network element of said network; (iii) determining that the first network element is in communication with the second network element; (iv) generating a determination that there exists an available Attack Chain that exploits both (I) the first vulnerability at the first network element and (II) the second vulnerability at the second network element; (v) determining a threat score for said Attack Chain, based on a formula that takes into account at least: (I) stealth level of an attack that exploits the first vulnerability, (II) stealth level of an attack that exploits the second vulnerability, (III) estimated success of the attack that exploits the first vulnerability, (IV) estimated success of the attack that exploits the second vulnerability.

In some embodiments, a method of determining cyber-attack vectors and mitigating cyber-attacks may include: scanning and mapping a network, and collecting data about network elements; generating a Permissions Directed-Graph, which indicates permissions that each network element has; generating a Network Connectivity Directed-Graph, which indicates accessible direct-communication routes between network elements; obtaining a list of attack techniques; applying a Static Verification process on the list of attack techniques, to generate an initial version of an Attacks Directed-Graph which maps particular attacks to network elements that are represented in the Permissions Directed-Graph and in the Network Connectivity Directed-Graph; performing a Dynamic Verification process, and constructing an updated list of dynamically-verified Attack Vectors that were verified as available within a particular operational context; generating a ranking for each dynamically-verified Attack Vector; prioritizing the dynamically-verified Attack Vectors, and prioritizing threat mitigation resources; activating threat mitigation resources based on the prioritization outputs.

Some embodiments provide a non-transitory storage medium or storage article having stored thereon instructions that, when executed by one or more processors, cause the one or more processors to perform a method as described above.

Some embodiments provide a system comprising one or more processors, operably associated with one or more memory units that stores program code or data; wherein the one or more processors are configured to perform a method as described above.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, accelerometer(s), gyroscope(s), compass unit(s), device orientation sensor(s), network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

In some embodiments, a system or an apparatus may comprise at least one processor or that is communicatively coupled to a memory unit and configured to operate execute code, wherein the at least one processor is further configured to perform the operations and/or the functionalities describes above.

Some embodiments may provide to a computerized system or network, new capabilities to automatically and/or autonomously protect itself against cyber-attacks and/or fraudulent operations; by automatically and/or autonomously scanning the network elements, generating directed-graphs about their permissions and roles and connectivity levels, performing static verification and dynamic verification of possible threats or attacks, and prioritizing which threats should be mitigated first, and/or which threat mitigation tools should be deployed first, and/or by triggering and/or initiating the activation of such mitigation operations or mitigation units.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A computerized method, comprising:
   (a) scanning and mapping a network, of an organization or a venue or a domain; and collecting data and meta-data about network elements of said network;
   (b) generating a Permissions Directed-Graph (G1), which indicates permissions that each network element has; wherein each vertex in the Permissions Directed-Graph (G1) represents a network element; wherein each edge in the Permissions Directed-Graph (G1) represents a relationship between two network elements; wherein the Permissions Directed-Graph (G1) represents at least whether a particular user has or does not have access to a particular machine;
   (c) generating a Network Connectivity Directed-Graph (G2), which indicates accessible direct-communication routes between network elements;
   (d) obtaining a list of attack techniques; and applying a Static Verification process on the list of attack techniques, to generate an initial version of an Attacks Directed-Graph (G3) which maps particular attacks to network elements that are represented in the Permissions Directed-Graph (G1) and in the Network Connectivity Directed-Graph (G2); wherein the Static Verification process comprises generating an initial list of all relevant cyber-attack techniques regardless of context;
   (e) performing a Dynamic Verification process on said initial list of all relevant cyber-attack techniques, and constructing an updated list of dynamically-verified Attack Vectors that were verified as being available within a particular operational context;
   (f) generating a Ranking for each dynamically-verified Attack Vector in the updated list of dynamically-verified Attack Vectors;

(g) based on rankings generated in step (f), performing prioritization of the dynamically-verified Attack Vectors and performing prioritization of threat mitigation resources;

(h) activating one or more threat mitigation resources, based on one or more prioritization outputs generated in step (g).

2. The computerized method of claim 1, wherein step (a) comprises:

querying an Active Directory (AD) service, which stores data and meta-data about machines in said network, about users in said network, and about roles in said network;

generating links between users and machines in said network, by analyzing roles and permissions in said network and by checking which users are logged-on to which machines.

3. The computerized method of claim 2, wherein said querying is performed via a domain user which has read-only access privileges towards the Active Directory (AD) service, without full read-and-write access to the Active Directory (AD) service, to reduce risk to said network.

4. The computerized method of claim 1, wherein step (c) generates said Network Connectivity Directed-Graph (G2) having vertices;

wherein a node of a vertex in the Network Connectivity Directed-Graph (G2) represents an object from a pool of objects that includes at least: a computer.

5. The computerized method of claim 1, wherein step (d) comprises:

performing a pre-conditions checking process, to check whether or not a pre-condition for applying a particular Attack Technique holds true with regard to a particular network element;

if the checking result is negative, then: excluding said Attack Technique from the Attacks Directed-Graph (G3).

6. The computerized method of claim 1, wherein at least one of step (d) and step (e) comprises:

defining and utilizing States and Attack Chains in the Attacks Directed-Graph (G3), wherein a State is a vertex representing either a machine or a user, wherein an Attack Chain is a particular graph-portion having three nodes that are connected by two directed edges;

wherein each Attack Chain is generated as being associated with five parameters which comprise: (i) a Source State, (ii) a particular Attack Technique, (iii) an End State, (iv) a first edge connecting the Source State to the particular Attack Technique, (v) a second edge connecting the particular Attack Technique to the End State.

7. The computerized method of claim 6, wherein step (e) comprises:

performing dynamic verification by utilizing a list of Attack Chains in the Attacks Directed-Graph (G3), and by verifying whether or not for a given context it is possible to construct a particular Attack Vector towards a particular user and a particular machine based on available connectivity data and on available permissions data.

8. The computerized method of claim 1, wherein step (e) comprises:

performing dynamic verification by:

defining a Path P (s, g) in the Attacks Directed-Graph (G3), as an ordered sequence of attack chains (C1, . . . Cn), wherein "s" is a first state of C1, wherein "g" is a last state of Cn;

wherein the attack chains in said sequence, when followed orderly from C1 to Cn, constitute a valid directed path in the Attacks Directed-Graph (G3) from "s" to "g";

wherein the dynamic verification is performed in relation to a context-pair, wherein each context-pair comprises: (i) a User-Context indicating a user and its permissions, and (ii) a Machine-Context indicating a machine and its connectivity.

9. The computerized method of claim 1, wherein step (f) comprises:

determining that a first Attack Chain has a first number of attack segments that are required to carry out a first attack towards a particular machine;

determining that a second Attack Chain has a second number of attack segments that are required to carry out a second attack towards said particular machine;

assigning a first threat-score to the first Attack Chain, and assigning a second, smaller, threat-score to the second Attack Chain, based on the second number of attack segments being smaller than the first number of attack segments.

10. The computerized method of claim 1, wherein step (f) comprises:

defining a first Vulnerability as a vulnerability that is frequently utilized by cyber-attackers;

defining a second Vulnerability as a vulnerability that is rarely utilized by cyber-attackers;

determining that a first Attack Chain against a particular network element is available in said network due to existence of the first vulnerability;

determining that a second Attack Chain against said particular network element is available in said network due to existence of the second vulnerability;

assigning a first ranking to the first Attack Chain, and assigning a second, smaller, ranking to the second Attack Chain, since the first Attack Chain utilizes the first vulnerability that is utilized frequently and since the second Attack Chain utilizes the second vulnerability that is utilized rarely.

11. The computerized method of claim 1, wherein step (f) comprises:

defining a first Vulnerability as a vulnerability that is exploitable via a first attack tool that has a high probability of being discovered by cyber security protection tools;

defining a second Vulnerability as a vulnerability that is exploitable via a second attack tool that has a low probability of being discovered by cyber security protection tools;

determining that a first Attack Chain against a particular network element is available in said network due to existence of the first vulnerability;

determining that a second Attack Chain against said particular network element is available in said network due to existence of the second vulnerability;

assigning a first ranking to the first Attack Chain, and assigning a second, greater, ranking to the second Attack Chain, since the first Attack Chain utilizes the first vulnerability which is exploitable via the first attack tool that has the high probability of being discovered, and since the second Attack Chain utilizes the second vulnerability which is exploitable via the second attack tool that has the low probability of being discovered.

12. The computerized method of claim 1, comprising:
generating a Ranking of an Attack Vector as a sum of the rankings of the attack chains that are included in said Attack Vector,
wherein the Attack Vector AV is a sequence of multiple attack chains.

13. The computerized method of claim 12, comprising:
generating a Ranking of each Attack Chain of said Attack vector, by:
determining a Reliability score for each Attack Chain, indicating and quantifying a level of success of said Attack Chain to achieve an attack goal;
determining a Stealth score for each Attack Chain, indicating and quantifying a probability that exploitation of said Attack Chain by an attacker will be discovered by cyber-attack protection tools;
determining said Ranking of each Attack Chain of said Attack vector based on a weighted formula that takes into account said Reliability score and said Stealth score.

14. The computerized method of claim 1,
wherein step (g) comprises:
determining that a first dynamically-verified Attack Vector can be mitigated via a first mitigation operation;
determining that a second dynamically-verified Attack Vector can be mitigated via a second, different, mitigation operation;
determining that a third dynamically-verified Attack Vector can also be mitigated via said second mitigation operation;
assigning a priority to the first mitigation operation, that is higher than a priority assigned to the second mitigation operation, based on a determination that the second mitigation operation can mitigate a greater number of dynamically-verified Attack Vector relative to the first mitigation operation.

15. The computerized method of claim 1,
wherein step (g) comprises:
determining rankings to available cyber-attack mitigation operations, based on the number of dynamically-verified Attack Vectors that are estimated to be defeated by deploying each available cyber-attack mitigation operation.

16. The computerized method of claim 1,
wherein step (g) comprises:
determining that a first Attack Chain is a segment in N different Attack Vectors in said network;
determining that a second, different, Attack Chain is a segment in M different Attack Vectors in said network;
determining that N is greater than M; and therefore, assigning a greater ranking to (i) deployment of a first mitigation operation that blocks the first Attack Chain, relative to (ii) deployment of a second, different, mitigation operation that blocks the second Attack Chain.

17. The computerized method of claim 1, wherein at least one of step (d) and step (e) comprises:
(I) initially tagging a particular Attack Vector as an attack vector that is a threat to said network due to existence of one or more particular Vulnerabilities that said particular Attack Vector exploits;
(II) subsequently, un-tagging said particular Attack Vector as a threat to said network, due to a determination that said vulnerability cannot be exploited due to at least one of:
(i) lack of a permission of a particular user to perform a particular operation, (ii) lack of connectivity between two particular network elements.

18. The computerized method of claim 1,
wherein at least one of step (d) and step (e) comprises:
(i) determining that a first vulnerability exists at a first network element of said network;
(ii) determining that a second, different, vulnerability exists at a second, different, network element of said network;
(iii) determining that the first network element is in communication with the second network element;
(iv) generating a determination that there exists an available Attack Chain that exploits both (I) the first vulnerability at the first network element and (II) the second vulnerability at the second network element;
(v) determining a threat score for said Attack Chain, based on a formula that takes into account at least: (I) stealth level of an attack that exploits the first vulnerability, (II) stealth level of an attack that exploits the second vulnerability, (III) estimated success of the attack that exploits the first vulnerability, (IV) estimated success of the attack that exploits the second vulnerability.

19. A non-transitory storage medium having stored thereon instructions that, when executed by one or more processors, cause the one or more processors to perform a method comprising:
(a) scanning and mapping a network, of an organization or a venue or a domain; and collecting data and meta-data about network elements of said network;
(b) generating a Permissions Directed-Graph (G1), which indicates permissions that each network element has; wherein each vertex in the Permissions Directed-Graph (G1) represents a network element; wherein each edge in the Permissions Directed-Graph (G1) represents a relationship between two network elements; wherein the Permissions Directed-Graph (G1) represents at least whether a particular user has or does not have access to a particular machine;
(c) generating a Network Connectivity Directed-Graph (G2), which indicates accessible direct-communication routes between network elements;
(d) obtaining a list of attack techniques; and applying a Static Verification process on the list of attack techniques, to generate an initial version of an Attacks Directed-Graph (G3) which maps particular attacks to network elements that are represented in the Permissions Directed-Graph (G1) and in the Network Connectivity Directed-Graph (G2); wherein the Static Verification process comprises generating an initial list of all relevant cyber-attack techniques regardless of context;
(e) performing a Dynamic Verification process on said initial list of all relevant cyber-attack techniques, and constructing an updated list of dynamically-verified Attack Vectors that were verified as being available within a particular operational context;
(f) generating a Ranking for each dynamically-verified Attack Vector in the updated list of dynamically-verified Attack Vectors;

(g) based on rankings generated in step (f), performing prioritization of the dynamically-verified Attack Vectors and performing prioritization of threat mitigation resources;

(h) activating one or more threat mitigation resources, based on one or more prioritization outputs generated in step (g).

20. A system comprising:

one or more processors, operably associated with one or more memory units that stores program code or data, wherein the one or more processors are configured to perform:

(a) scanning and mapping a network, of an organization or a venue or a domain; and collecting data and meta-data about network elements of said network;

(b) generating a Permissions Directed-Graph (G1), which indicates permissions that each network element has; wherein each vertex in the Permissions Directed-Graph (G1) represents a network element; wherein each edge in the Permissions Directed-Graph (G1) represents a relationship between two network elements; wherein the Permissions Directed-Graph (G1) represents at least whether a particular user has or does not have access to a particular machine;

(c) generating a Network Connectivity Directed-Graph (G2), which indicates accessible direct-communication routes between network elements;

(d) obtaining a list of attack techniques; and applying a Static Verification process on the list of attack techniques, to generate an initial version of an Attacks Directed-Graph (G3) which maps particular attacks to network elements that are represented in the Permissions Directed-Graph (G1) and in the Network Connectivity Directed-Graph (G2); wherein the Static Verification process comprises generating an initial list of all relevant cyber-attack techniques regardless of context;

(e) performing a Dynamic Verification process on said initial list of all relevant cyber-attack techniques, and constructing an updated list of dynamically-verified Attack Vectors that were verified as being available within a particular operational context;

(f) generating a Ranking for each dynamically-verified Attack Vector in the updated list of dynamically-verified Attack Vectors;

(g) based on rankings generated in step (f), performing prioritization of the dynamically-verified Attack Vectors and performing prioritization of threat mitigation resources;

(h) activating one or more threat mitigation resources, based on one or more prioritization outputs generated in step (g).

* * * * *